W. H. GAULKE.
VIBRATOR.
APPLICATION FILED JAN. 18, 1915.
1,184,675.
Patented May 23, 1916.
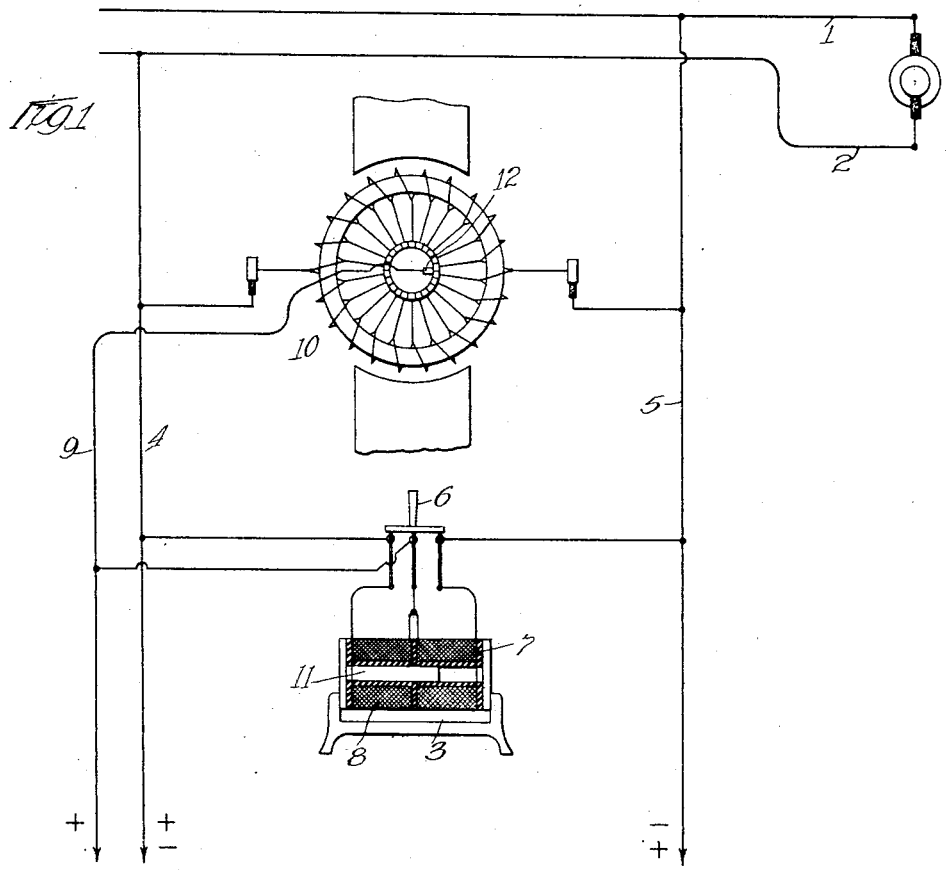
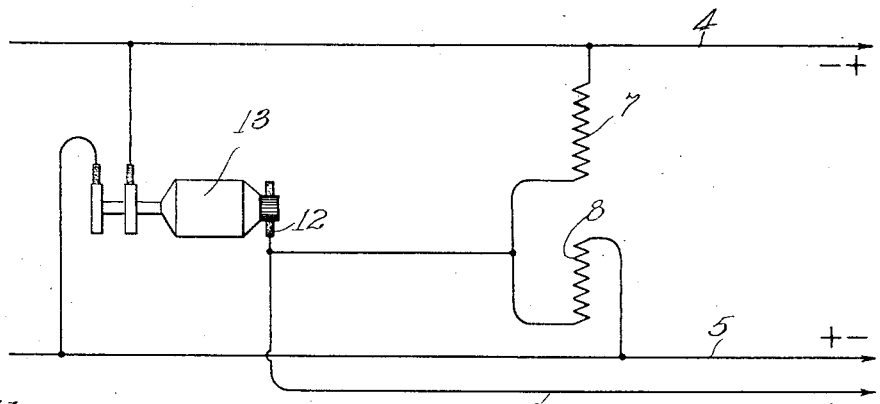
Witnesses:
Inventor:
William H. Gaulke,
By *illegible*
Atty.

UNITED STATES PATENT OFFICE.

WILLIAM H. GAULKE, OF MILWAUKEE, WISCONSIN, ASSIGNOR TO INTERNATIONAL ELECTRIC TOOL CO., OF MILWAUKEE, WISCONSIN.

VIBRATOR.

1,184,675.  Specification of Letters Patent.  Patented May 23, 1916.

Application filed January 18, 1915. Serial No. 2,900.

*To all whom it may concern:*

Be it known that I, WILLIAM H. GAULKE, a citizen of the United States, residing at Milwaukee, in the county of Milwaukee and State of Wisconsin, have invented a certain new and useful Improvement in Vibrators, of which the following is a full, clear, concise, and exact description, reference being had to the accompanying drawings, forming a part of this specification.

My invention relates to vibrating devices and is more particularly designed to provide a vibrating device having a coil or coils in which said coil or coils are connected to a source of alternating current and in which auxiliary means are provided to maintain one terminal of said coil or coils at a more or less constant potential, thereby to cause the rapid alternate energization and de-energization of said coil or coils.

When I say that the one terminal is to be maintained at substantially constant potential in either this description or the claims, I mean of course that this potential is to be maintained at such value or values whereby a changing difference of potential is established across the terminals of the coil in the course of each cycle of the alternating current source.

I find that I am enabled to secure much better results with vibrators when the coil or coils thereof are supplied with current from an alternating current source, and one terminal of said coil or coils has its potential so held as to cause gradual change of difference of potential across the coil terminals. It will thus be seen that I am enabled to operate vibrators directly from a source of altenating current and that I need provide merely means which govern the potential of one terminal of each of the coils. In this particular case the last means recited are of course practically independent of the number of vibrators which are operated from the alternating current source.

I will explain my invention more in detail by referring to the accompanying drawing in which—

Fig. 1 is a diagrammatic view indicating a system constructed in accordance with my invention, and Fig. 2 shows diagrammatically the preferred form of connecting the vibrator coils.

In this illustration I have two means respectively 1 and 2 which are directly connected to an alternating current source of supply. I show a vibrator 3 which is merely illustrative of one of a great plurality of vibrators that may be used and operated from the mains 1 and 2. It will be seen that the vibrator is connected directly to conductors 4 and 5 when the switch 6 is closed so that the two coils 7 and 8 receive their current in series from these conductors 4 and 5. The coils 7 and 8 have their free terminals connected together and connected by means of the switch 6 to a third conductor 9.

In the embodiment herein shown, I provide an auxiliary source of power, for instance, a dynamo electric machine 10 which can maintain a fixed or substantially fixed potential of the conductor 9. Under this condition it will be seen that if the conductor 9 is maintained at a given potential, say positive, and the respective conductors 4 and 5 are alternately positive and negative, that first one coil 7 and then the other coil 8 will receive current, thus to move the plunger or vibrating element 11. The conductors 4, 5 and 9 may then continue on to serve other vibrators as will be readily understood. The dynamo electric machine 10 may be a converter, for instance, as shown operating directly from the alternating current circuit and having a commutator whose brush 12 is always, of course, at a given potential. This brush is then connected to the conductor 9 and maintains the potential of the conductor 9 at a given point.

It will be seen that the size of the dynamo electric machine 10 has practically little or nothing to do with the number of vibrators 3 that may be operated as the current to supply them comes directly from the mains 1 and 2. Thus the small auxiliary machine requires a very small no-load current and thus the expense of providing this point of given potential is at a minimum. Practically no operating expense is necessary and a great number of vibrators can be used whose cost of operation for current is entirely dependent upon the amount of current taken from the supply mains 1 and 2.

In Fig. 2 I show a converter 13 of the drum type controlling the potential of the free terminals of the coils 7 and 8, this Fig. 2 setting forth the preferred way of connecting the coils 7 and 8 across the mains 4 and 5. It will be seen that the coils are here shown as reversely connected. It may be pointed out of course that the converter 13 need not necessarily be driven from the mains 4 and 5, but that the converter may be a dynamo pure and simple driven in any suitable way and furnish both alternating current and a terminal having a more or less constant potential.

From the above description my invention will be readily apparent, but

Having thus for illustrative purposes described one form which my invention may take, what I claim as new and desire to secure by Letters Patent is:

1. A system of the character described including a pair of coils, and means for rapidly and alternately operatively energizing said coils, said means including a source of alternating current from which said coils receive their current together with a motor driven from said source and having means for alternately short circuiting one of said coils without disturbing the connection of said coils with said source of current.

2. A system of the character described including a coil, and means for rapidly energizing and deënergizing said coil, said means including a source of alternating current from which said coil receives its current together with a motor driven from said source and having means for periodically short circuiting said coil without disturbing the connection of said coil with said source of current.

3. A system of the character described including a pair of coils, and means for rapidly and alternately operatively energizing and deënergizing said coils, said means including a source of alternating current from which said coils receive their current together with a motor operated from said source of current and adapted to maintain one terminal of each of said coils substantially at a given potential.

4. A system of the character described including a coil, and means for rapidly and alternately operatively energizing and deënergizing said coil, said means including a source of alternating current from which said coil receives its current together with a motor operated from said source and adapted to maintain one terminal of said coil at a given potential.

5. A system of the character described including a pair of coils, and means for rapidly and alternately operatively energizing and deënergizing said coils, said means including a source of alternating current from which said coils receive their current together with a motor operated from said source of current and adapted to maintain one terminal of each of said coils substantially at a given potential, said motor being substantially unaffected by the connection or disconnection of said coils from said circuit.

6. A system of the character described including a pair of coils, and means for rapidly and alternately operatively energizing and deënergizing said coils, said means including a source of alternating current from which said coils receive all of their current, and means associated with one terminal of each of said coils to maintain said terminals at a predetermined potential.

7. A system of the character described including a pair of coils, and means for rapidly and alternately operatively energizing and deënergizing said coils, said means including a source of alternating current from which said coils receive all of their current, means associated with one terminal of each of said coils to maintain said terminals at a given potential, and a vibrating plunger under the control of said coils.

In witness whereof, I hereunto subscribe my name this 31st day of December, A. D., 1914.

WILLIAM H. GAULKE.

Witnesses:
WILLIAM R. SORGEL,
PETER NEUMANN.

Copies of this patent may be obtained for five cents each, by addressing the "Commissioner of Patents, Washington, D. C."